June 2, 1942.     E. H. PIRON     2,284,985
VEHICLE SPRINGING SYSTEM
Filed June 26, 1933
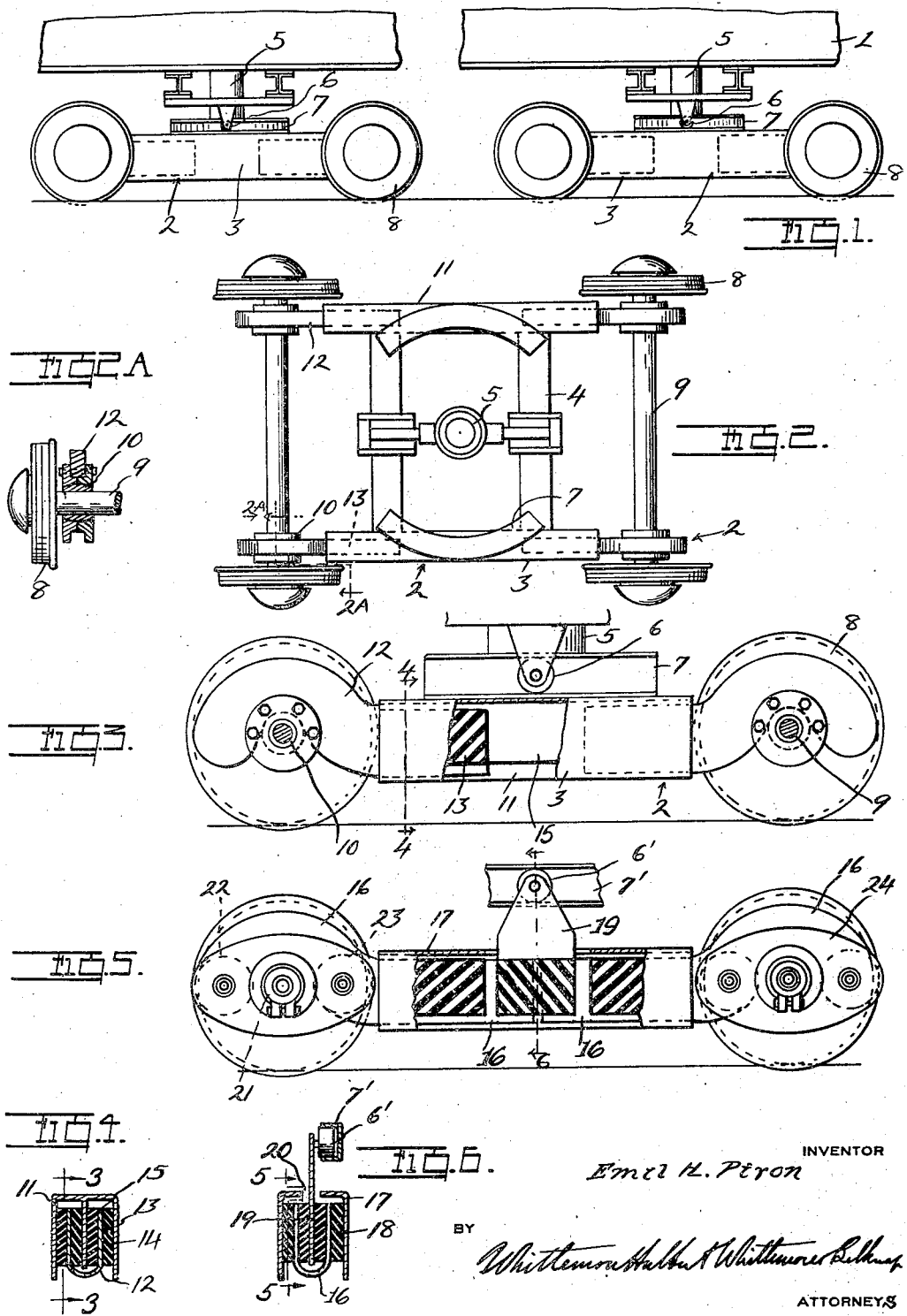
INVENTOR
Emil H. Piron
BY
Whittemore Hulbert & Whittemore Belknap
ATTORNEYS Patented June 2, 1942

2,284,985

UNITED STATES PATENT OFFICE 2,284,985

VEHICLE SPRINGING SYSTEM

Emil H. Piron, Highland Park, Mich., assignor, by mesne assignments, to Transit Research Corporation, New York, N. Y., a corporation of New York Application June 26, 1933, Serial No. 677,729

16 Claims. (Cl. 105—224.1)

This invention relates to springing systems for use particularly in rail vehicles and has for its object to provide a novel system characterized by its simplicity of construction and its excellent vibration damping qualities.

The major motions of a rail vehicle, such for instance, as those of a street car, may be briefly described as rolling, nosing and pitching. In order to convert the various motions into vibrations of acceptable riding comfort, it is conventional to employ journal springs, a resiliently supported truck bolster including side springs and, sometimes, a center pin supporting structure embodying resiliency. It has been found that this conventional, complicated and costly springing system may be replaced by a single set of springs capable of performing all functions necessary for proper operation and comfortable riding, this single set, if desired, being adaptable for use with other springs, such as journal springs. It is therefore the specific object of this invention to provide a novel truck which embodies a springing system so arranged as to constitute a resilient wheel suspension system and which will also provide resiliency as a body supporting means.

In carrying my invention into practice, I provide a sturdy truck frame comprising cross members and side girders, the side girders being of multi-piece construction with the center part rigidly secured to the cross members and the end parts resiliently secured to the center part. The end parts may be termed journal bearing arms, since the journal bearings and hence the truck axles are mounted at the outer ends thereof. As a preferred form of resilient attachment for the center part of the girders to these journal bearing arms the use of the so-called rubber sandwiches is recommended, as by this construction it is a matter of calculation to obtain a desired amount of relative vertical and transverse motion between the arms and the girder.

A further object, as suggested above, is to provide in this single set of springing devices for relative lateral motion of the truck wheels with respect to the truck frame proper. Conventionally, this requirement is met by an axle and journal bearing construction in which the axle is free to slide axially of itself in the bearing. In the present construction, this lost motion arrangement is relegated in favor of a controlled resiliency, as determined by the thickness and quality of the rubber employed. Due to the initial and increasing resistance offered by the rubber, the actual lateral motion necessary to proper operation has been found to be less than the amount of motion provided in the conventional lost motion arrangement.

A further object is to provide axle supports of such type that the journal arms will not be subjected to torsion as opposite wheels encounter track irregularities of different size, it being understood that a tilting of the axle with respect to the frame would set up torsion in the arms and also possibly in the frame unless such provision were made. As will be hereafter more fully explained, I accomplish this by providing a universal mounting for the journal bearing and thus closely approach an individual wheel suspension, since one wheel may be elevated without effecting a corresponding movement by the opposite axle support.

It is a further object to employ this single springing system to provide for and to yieldably resist the rolling of the car body with respect to the axles, the frame and the body in this case being capable of practically no free relative vertical movement. The period of roll which will be of a comforting order is known in the art and may be pre-selected. Since the period of roll is dependent upon the softness and general characteristics of the rubber and the weight impressed thereon, the springing devices may be so constructed in the present instance as to impart the desired period to the car body, while at the same time damping irregular wheel motions, as referred to above.

Another object is to provide a springing system which will substantially sound insulate the wheels and axles from the remainder of the truck, thus subduing the customary truck noises.

A further object, as may be understood from the foregoing, is to provide a springing system wherein all motions of the car body and car wheels are specifically and resiliently provided for whereby all lost motion connections are obviated.

Other objects and advantages, either directly described or indirectly accruing from the favorable relation of parts, will become hereinafter more fully apparent as reference is had to the accompanying drawing, wherein my invention is illustrated by way of example and not in a limiting sense, and in which Figure 1 is a side elevation, partly broken away, of a vehicle and its springing system showing an embodiment of my invention;

Figure 2 is a plan view of a truck of the vehicle;

Figure 2^A is a cross section on the line 2^A—2^A of Figure 2;

Figure 3 is a side elevation thereof partly broken away on the line 3—3 of Figure 4;

Figure 4 is a cross section on the line 4—4 of Figure 3;

Figure 5 is a view similar to Figure 3 showing another embodiment of my invention and partly broken away on the line 5—5 of Figure 6;

Figure 6 is a cross section on the line 6—6 of Figure 5.

The vehicle illustrated in the present instance is a rail vehicle, such as a street car, having the car body 1, which is mounted upon trucks 2 at each of its ends. The frame of each truck comprises the side girders 3 and the cross beams 4 secured to the side girders. This frame is swively attached to the car body by the center pin structure 5 and by the rollers 6 and the tracks 7, the connection being such that while the frame of each truck is swively attached to the car body, it is also adapted to move substantially in accord with and without lost motion with reference to the car body during the vertical and rolling movements of the latter.

The wheels 8 of each truck are secured to the axles 9, which are journaled in the bearings 10 at the ends of the truck frame. Each of the side girders of the truck frame is multi-piece and comprises the center part 11, which is rigidly secured to the cross beams 4, and the end parts 12, which latter are in the nature of arms or levers, universally connected to the opposite ends of the center part. The journal bearings are universally mounted in the arms or levers, the mountings being either metallic, as shown in Figure 3, or of rubber, as shown in Figure 5, or of any other suitable construction. Each center part is hollow and, as shown particularly in Figure 4, is channel-shaped with the channel opening downwardly. Each arm or lever has its portion which telescopes within the center part hollow, and, as also shown in Figure 4, channel-shaped with the channel opening upwardly.

For swingably connecting or articulating the telescoping portions of each arm or lever and the center part of the side girders of Figure 3, I have provided the rubber sandwiches 13, shown particularly in Figure 4. Each sandwich comprises the masses of rubber or the rubber cushioning elements 14, which are on opposite sides of the flanges of each arm or lever and inside the flanges of the center part. This center part is preferably provided with the longitudinally extending depending flange 15 midway between the side flanges and separating the rubber masses or elements inside the arm or lever. The masses of rubber are maintained under continuous compression in a horizontal direction or a direction normal to the direction of the loading imposed by the car body and this compression is of sufficient magnitude to set up a frictional locking engagement of the masses of rubber with the telescoping portions of the side girders capable of obviating slippage of the masses of rubber and telescoping portions during operation.

With this construction, relative movement between the end parts and the center parts of the side girders at the hinges connecting these parts is yieldably resisted as to both vertical and longitudinal movement by the masses of rubber in shear and relative vertical swinging movement of the end parts and the center parts is resisted by the masses of rubber in torsional shear. Also, the masses of rubber resist transverse movement, including transverse swinging, of the end parts and the center parts by compression and the resiliency of the masses of rubber may be controlled, it being determined by the thickness and quality of the masses. The amounts of transverse movements can be predetermined and limited to an amount to assure that the wheels will not become derailed because of the resiliency of the masses of rubber in this direction. Moreover, the masses of rubber provide a universal connection between the end parts and the center parts, and the journal bearings for the axles are universally mounted in the end parts, so that the axles may tilt without distorting the end parts. As a result, it will be seen that I have provided a simple springing system so arranged that it constitutes a resilient wheel suspension system and also provides resiliency which can be controlled to give predetermined characteristics for a complete car body springing system as a car body supporting means. Also the springing system provides for and yieldably resists rolling of the car body with respect to the axles and wheels and since the period of roll is dependent upon the characteristics of the rubber and the weight imposed thereon, this period may be pre-selected. Furthermore, the springing system is such that all lost motion connections between the car body and the trucks and between the trucks and the axles or wheels may be eliminated and at the same time all essential motions of the parts are provided for. In addition, the springing system is such that it substantially sound insulates the wheels and axles from the remainder of the truck.

In the modification shown in Figures 5 and 6, each of the end parts 16 of the side girders is connected to the center part 17 by the additional rubber sandwiches 18 at the inner end of each end part. Each rubber sandwich 18 also functions to connect the truck frame to the car body so that all relative movement between the frame and car body is yieldably resisted.

Each sandwich 18 is formed in substantially the same manner as each sandwich 13, but the central vertically extending plate 19 which corresponds to the flange 15 extends upwardly through the opening 20 in the web of the center part and carries at its upper end the roller 6' which engages the arcuate track 7' mounted upon the car body concentric with the axis of the center pin structure.

As shown in this modification, the journal bearings 21 for the axle are universally mounted in the arms or levers 16, each mounting preferably comprising the rubber cushioning elements 22 and 23 between an arm or lever 16 and the associated shear plates 24. These shear plates radiate from the associated journal bearing and are located on opposite sides of the arm or lever. The mountings, as shown, are of that type described and illustrated in my co-pending application Serial Number 664,247 filed April 3, 1933, but it is apparent that other constructions of universal mountings using rubber may be employed.

In the form illustrated in Figure 3, the arm 12 is adapted to swing about a rather definite point which is at the center of the rubber sandwich. In the form illustrated in Figure 5, however, the point of pivoting of the arm 12 is somewhere between the centers of the two sandwiches, the exact point being dependent upon the severity of the disturbance causing the displacement of the arm, upon the relative sizes of the sandwiches, upon the tendency to rolling at the instant of the impact, and upon other considerations. In this form, if the lever be elevated a slight amount the car body will not be elevated, but will be depressed, since the weight of the body is taken on the other side of the point of pivoting from the wheel, so that it is possible to design such a truck to give an infinite variety of riding qualities by varying the distance between the sandwiches, by varying the length of arm outwardly of the sandwiches and by varying the characteristics of the rubber.

What I claim as my invention is:

1. In a rail truck frame, cross beams, side girders, wheel suspensory arms elastically connected to said girders, said arms being bodily movable relative to said girders in both vertical and lateral directions, cushioning means for yieldably resisting every movement of said arms with respect to said girders, journal bearings for supporting said arms, and elastic means operatively connecting said journal bearings to said arms.

2. In a rail truck frame, cross beams, side girders rigidly secured to said cross beams, wheel suspensory arms articulated to said girders at each end thereof, said arms being capable of slight fore and aft movement and vertical swinging movement with respect to said girders, cushioning means for yieldably resisting the fore and aft movement, journal bearings, and elastic elements fore and aft of each of said journal bearings through which said bearings are connected to said arms.

3. In a truck for a rail vehicle, a frame comprising cross beams and side girders, said side girders being of multi-piece construction with each part articulated to each adjacent part, journal bearings mounted at the outer ends of each of said girders, relative movement between said parts being elastically resisted at the region of articulation as to vertical movement and yieldable means fore and aft of each of said journal bearings constituting a universal connection for and also a means for resisting relative movements between said journal bearings and said frame.

4. In a truck for rail vehicles, a frame comprising cross beams and side girders, said side girders being of multi-piece construction with each part articulated to each adjacent part, journal bearings mounted at the outer ends of each of said girders, said parts being yieldably resisted as to relative motion at their regions of articulation both in vertical and horizontal directions and rubber elements supporting said journal bearings from said ends in shear.

5. In a truck for rail vehicles, a frame composed of cross beams and side girders rigidly secured thereto, said girders having opposed masses of rubber secured thereto, journal bearings mounted on arms, said arms extending between said masses of rubber for support thereby, said rubber resisting relative vertical and longitudinal movement of said arms and said girders in shear and resisting relative transverse movement of said arms and said girders by compression.

6. In a truck for rail vehicles, a frame composed of cross beams and hollow side girders rigidly secured thereto, said girders housing opposed masses of rubber towards each end thereof, and a wheel suspensory arm extending into each of said girders at each end thereof for residence between said masses of rubber, said rubber resisting relative vertical swinging movement of said arm with respect to said girder in torsional shear and resisting relative transverse swinging movement of said arm and said girder by compression.

7. In a truck for rail vehicles, a frame composed of cross beams and side girders rigidly secured thereto, rubber cushioning elements carried by said girders, journal bearings, and suspensory levers connecting said journal bearings and said rubber elements, said levers extending in the direction of said side girders, said rubber elements supporting said frame from said levers in torsional shear.

8. In a truck for rail vehicles, a frame composed of cross beams and side girders integrally secured thereto, rubber cushioning means carried by each of said girders toward each end thereof, journal bearings having axles therein, a suspensory lever extending from each of said bearings to one of said cushioning means for attachment thereto, and a universal connection between each of said bearings and its suspensory lever whereby a tilting of said axles may be effected without distorting any of said levers.

9. In a truck for rail vehicles, a frame composed of cross beams and side girders integrally secured thereto, opposed rubber elements housed by said girders toward each end thereof, journal bearings having axles mounted therein, a suspensory lever extending from each of said journal bearings between the rubber elements in one of said girders, said rubber resisting relative vertical and longitudinal motion between said arms and said girders in shear and resisting relative transverse motion therebetween by compression, said bearings being universally mounted in said levers whereby said levers remain free from distortion upon relative displacement with respect to other levers.

10. In combination, in a truck frame, side rails, wheel suspensory arms swingably connected to said side rails, journal bearings, and rubber cushioning means resisting vertical movements of said journal bearings with respect to said arms in resilient shear.

11. In combination, in a truck frame, side rails, wheel suspensory arms swingably connected to said side rails for vertical swinging, resilient means resisting said vertical swinging, said arms being also capable of lateral movement with respect to said rails, resilient cushioning means resisting the lateral movement, journal bearings, and elastic cushioning means between said arms and said journal bearings resisting all relative movements therebetween.

12. In combination, in a truck frame, side rails, wheel suspensory arms swingably connected to said side rails for vertical swinging, said arms also being capable of lateral swinging movements, rubber cushions between said rails and arms for resisting the lateral swinging, journal bearings, and elastic means supporting said journals in said arms in shear.

13. In a rail truck frame, cross beams, side girders secured to said cross beams, wheel suspensory levers paralleling said side girders for a substantial portion of their length and swingably connected thereto intermediate the length of said levers, the outer end of each of said arms being of U-shape for containing journal bearings for wheel axles, and means at the other end of said arms for accepting the weight of a car body inwardly of the swingable connections.

14. In a rail truck frame, cross beams, side girders secured to said cross beams, wheel suspensory arms overlapping said girders for a substantial distance, rubber cushioning elements intermediate the length of said arms residing between said arms and said girders and attached thereto to constitute a resilient universal connection therebetween, the outer end of each of said arms being adapted for connection to wheel axles, and a car body connection at the inner end of each of said arms for directly accepting the loading on said arms inwardly of said universal connection.

15. A railway vehicle truck comprising a car body supporting structure including means for mounting the body thereon for relative pivotal movement of said body and said structure about a vertical axis, a plurality of wheels fore and aft of said structure, means connecting said wheels and said structure including main vehicle springing means and comprising a plurality of arms each swingably connected to said structure and springing elements of elastic plastic material by which said arms are connected to said structure, said elements resisting relative vertical movements between said wheels and structure in torsion imposed through arcuate up and down movement of said arms.

16. A railway vehicle truck comprising a car body supporting structure including means for mounting the body thereon for relative pivotal movement of said body and said structure about a vertical axis, a plurality of wheels fore and aft of said structure, means connecting said wheels and said structure including main vehicle springing means and comprising a plurality of arms each swingably connected to said structure and torsion springs made of rubber-like material connecting said arms to said structure.

EMIL H. PIRON.